US011880014B2

United States Patent
Xu et al.

(10) Patent No.: US 11,880,014 B2
(45) Date of Patent: Jan. 23, 2024

(54) PREDICTION METHOD AND SYSTEM FOR CHANGES OF PHYSICAL PARAMETERS AFTER EARTHQUAKES

(71) Applicant: Shandong University, Weihai (CN)

(72) Inventors: Yan Xu, Weihai (CN); Ao Guo, Weihai (CN); Nan Jiang, Weihai (CN); Tianhe Xu, Weihai (CN)

(73) Assignee: SHANDONG UNIVERSITY, Weihai (CN)

( * ) Notice: Subject to any disclaimer, the term of this patent is extended or adjusted under 35 U.S.C. 154(b) by 0 days.

(21) Appl. No.: 18/206,631

(22) Filed: Jun. 7, 2023

(65) Prior Publication Data
US 2023/0400601 A1 Dec. 14, 2023

(30) Foreign Application Priority Data
Jun. 9, 2022 (CN) .......................... 202210643606.1

(51) Int. Cl.
*G01V 9/00* (2006.01)
*G01W 1/00* (2006.01)
(52) U.S. Cl.
CPC .............. *G01V 9/005* (2013.01); *G01W 1/00* (2013.01)
(58) Field of Classification Search
CPC .. G06F 30/20; G06F 2119/08; G06F 2119/12; G06F 2113/08; G01W 1/10; Y02A 90/10; G01V 9/005
USPC .......................................................... 702/2
See application file for complete search history.

(56) References Cited

FOREIGN PATENT DOCUMENTS

WO WO-2021094753 A1 * 5/2021 ........... G01S 19/073

OTHER PUBLICATIONS

S. Liu, L. Cui, L. Wu and Z. Wang, "Analysis on the water vapor anomaly before Wenchuan earthquake based on MODIS data," 2009 IEEE International Geoscience and Remote Sensing Symposium, Cape Town, South Africa, 2009, pp. II-412-II-415, doi: 10.1109/IGARSS.2009.5418102. (Year: 2009).*

* cited by examiner

*Primary Examiner* — John H Le
(74) *Attorney, Agent, or Firm* — Bayramoglu Law Offices LLC

(57) ABSTRACT

A prediction method for changes of physical parameters after earthquakes includes: obtaining a precipitable water vapor after an earthquake in a target monitoring area during a historical period; verifying the accuracy of the precipitable water vapor collected in the historical period; obtaining thermal anomaly data of the land surface temperature after the earthquake in the target monitoring area during the historical period; determining a time difference between peak of the precipitable water vapor and peak of the thermal anomaly of the land surface temperature; when the earthquake occurs again in the target monitoring area, detecting a time point corresponding to the peak of the thermal anomaly of the land surface temperature in the target monitoring area, adding the time point to the time difference to obtain a predicted time point of the peak of precipitable water vapor, and outputting the predicted time point as a time point of secondary disaster.

9 Claims, 12 Drawing Sheets

PREDICTION METHOD AND SYSTEM FOR CHANGES OF PHYSICAL PARAMETERS AFTER EARTHQUAKES

CROSS REFERENCE TO THE RELATED APPLICATIONS

This application is based upon and claims priority to Chinese Patent Application No. 202210643606.1, filed on Jun. 9, 2022, the entire contents of which are incorporated herein by reference.

TECHNICAL FIELD

The invention relates to the field of data processing technology for prediction purposes, in particular to a prediction method and system for changes of physical parameters after earthquakes.

BACKGROUND

The statement in this part only refers to the background technology related to the invention, which does not necessarily constitute the existing technology.

As one of the common natural disasters, earthquake has the characteristics of a sudden, destructive, and strong chain, which has brought great influence on people's production, life, and social economic development. After earthquakes, it is very easy to cause secondary disasters related to precipitation such as debris flow, landslides, and rainstorms. In these precipitation-related extreme weather and disasters, precipitable water vapor is closely related to precipitation.

At the same time, the earthquake process will lead to various physical and chemical changes, especially the significant change of land surface temperature in the epicenter caused by energy release. precipitable water vapor is mainly related to temperature and changes with temperature. With the increase in temperature, the capacity of air to hold water increases at the Clausius-Clapeyron rate.

At present, there are few studies on precipitable water vapor during earthquakes, most of them use land surface temperature to detect thermal anomalies before earthquakes to study earthquake prediction, or only one of the two studies of water vapor and land surface temperature during earthquakes and do not combine the two methods to detect post-earthquake meteorological parameter anomalies.

However, the lack of research on post-earthquake water vapor combined with land surface temperature thermal anomalies ignores that post-earthquake is a time point where secondary disasters are most likely to occur at the epicenter, which is very unfavorable for post-disaster rescue and reconstruction.

SUMMARY

In order to solve the shortcomings of the existing technology, the invention provides a prediction method and system for changes of physical parameters after earthquakes; using the BeiDou Navigation Satellite System to invert the precipitable water vapor in the epicenter and nearby areas after the earthquake, and further analyzing the relationship between precipitable water vapor and land surface temperature thermal anomalies.

In the first aspect, the invention provides a prediction method for changes of physical parameters after earthquakes.

A prediction method for changes of physical parameters after earthquakes includes:
   obtaining a precipitable water vapor after an earthquake in the target monitoring area during a historical period;
   verifying the accuracy of the precipitable water vapor collected in the historical period;
   obtaining thermal anomaly data of the land surface temperature after the earthquake in the target monitoring area during the historical period;
   based on the historical thermal anomaly data of the land surface temperature and the historical precipitable water vapor through accuracy verification, determining a time difference between the peak of the precipitable water vapor and the peak of the thermal anomaly of the land surface temperature;
   when the earthquake occurs again in the target monitoring area, detecting a time point corresponding to the peak value of the thermal anomaly of the land surface temperature in the target monitoring area, adding the time point to the time difference to obtain a predicted time point of the peak value of precipitable water vapor, and outputting the predicted time point as the time point of secondary disaster.

In the second aspect, the invention provides a prediction system for changes of physical parameters after earthquakes;
   a prediction system for physical parameter changes after earthquakes includes:
   the first acquisition module, which is configured to obtain the precipitable water vapor after the earthquake in the target monitoring area during the historical period;
   the accuracy verification module, which is configured to verify the accuracy of the precipitable water vapor collected in the historical period;
   the second acquisition module, which is configured to obtain the thermal anomaly data of the land surface temperature after the earthquake in the target monitoring area in the historical period;
   the time difference determination module, which is configured to determine the time difference between the peak of the precipitable water vapor and the peak of the thermal anomaly of the land surface temperature based on the historical thermal anomaly data of the land surface temperature and the historical precipitable water vapor through accuracy verification;
   the prediction output module, which is configured to detect the time point corresponding to the peak value of the thermal anomaly of the land surface temperature in the target monitoring area, adds the time point to the time difference to obtain the predicted time point of the peak value of precipitable water vapor and outputs the predicted time point as the time point of secondary disaster when the earthquake occurs again in the target monitoring area.

Compared with the existing technology, the beneficial effects of the invention are as follows:

The invention proposes a method for inverting the precipitable water vapor (PWV) in the epicenter and nearby areas after earthquakes using the BeiDou Navigation Satellite System (BDS) technology and further analyzing its relationship with the thermal anomaly of the land surface temperature. This method can truly obtain the precipitable water vapor in the epicenter area after the earthquake inverted by BDS, and verify the accuracy compared with the data in radiosonde (RS) and reanalysis data (ERA5), which proves the accuracy of the water vapor inversion technology of the BeiDou Navigation Satellite System, so as to use the precipitable water vapor inverted by BDS (BDS-PWV) to reflect the water vapor change after earthquakes, which has convincing and reference value. Secondly, combined with the land surface temperature products, the thermal anomalies caused by the earthquake are extracted from two time series scales, on the one hand, the land surface temperature comparison during the earthquake process, on the other hand, the land surface temperature comparison of the same area based on the background field data of 10 years. Finally, the delay interval between the precipitable water vapor and the thermal anomaly is obtained by combining the BDS-PWV change of precipitable water vapor inversed by BDS with the thermal anomaly change of land surface temperature at the epicenter after the earthquake, it provides a reference value for the prediction of secondary disasters and post-disaster reconstruction after earthquakes in this region in the future.

BRIEF DESCRIPTION OF THE DRAWINGS

The specification drawings that form part of the invention are used to provide a further understanding of the invention, and the schematic embodiment and descriptions of the invention are used to explain the invention, which does not constitute an improper limitation of the invention.

DETAILED DESCRIPTION OF THE EMBODIMENTS

Figure 1:
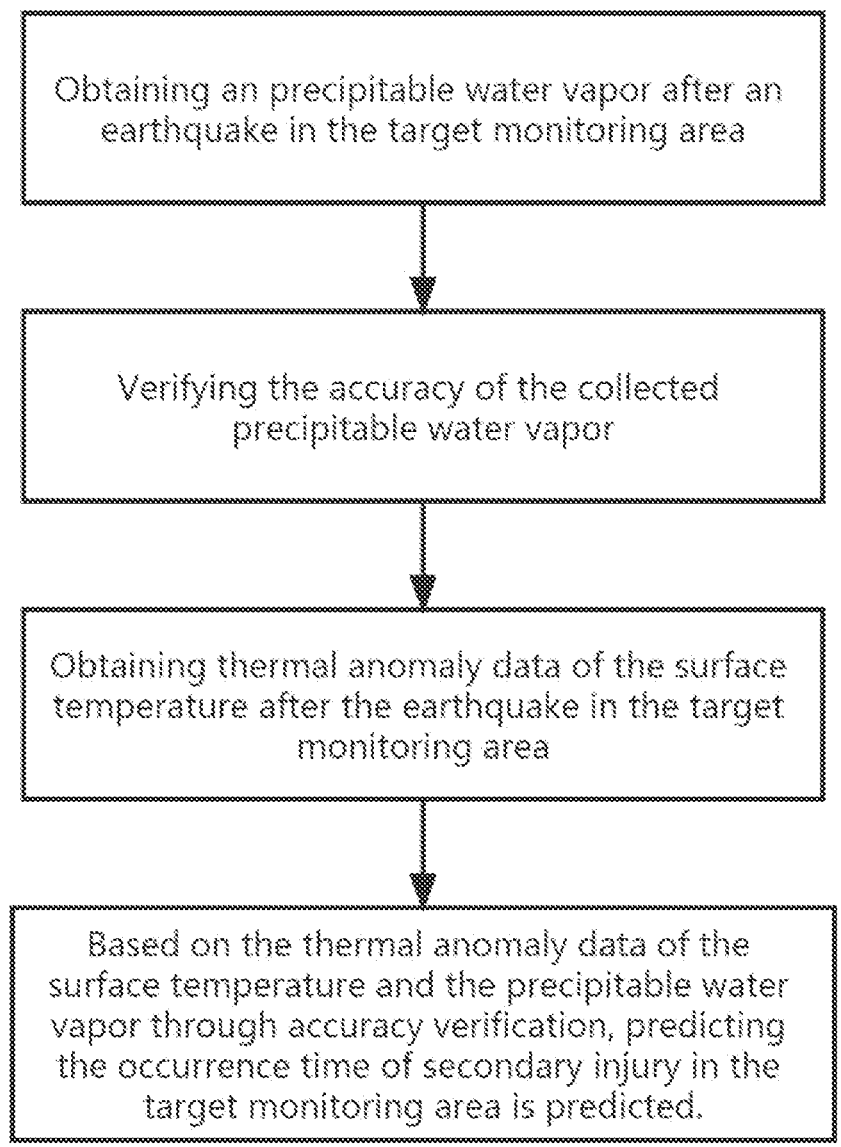
FIG. 1 is a method flow chart of Embodiment 1.

It should be noted that the following details are illustrative and are intended to provide further explanation of the invention. Unless otherwise specified, all technical and scientific terms used in this article have the same meaning as those commonly understood by ordinary technicians in the technical field to which the invention belongs.

It is important to note that the terms used here are only intended to describe the embodiment, not intended to limit the exemplary implementation based on the invention. As used here, the singular form is also intended to include the plural form unless the context otherwise clearly indicates, and it should be understood that the terms 'include' and 'comprise' and any deformation of them are intended to cover non-exclusive inclusion, for example, a process, method, system, product or device that contains a series of steps or units need not be limited to those steps or units that are clearly listed, but may include other steps or units that are not clearly listed or are inherent to those processes, methods, products or devices.

The embodiment and features in the embodiment of the invention can be combined without conflicts.

The acquisition of all data in this implementation is based on the legal application of data in accordance with laws and regulations and user consent.

Earthquakes are vibrations caused by sudden rupture and dislocation of the earth's crust under the action of tectonic forces, resulting in the rapid release of energy and causing many physical and chemical changes. After the earthquake, debris flow, landslides, rainstorms, and other secondary disasters related to precipitation are very easy to occur, which has a great impact on post-disaster rescue and reconstruction. Water vapor plays an indispensable role in these extreme weather and disasters related to precipitation. Water vapor participates in the water cycle between the surface system and the atmosphere through precipitation, surface evaporation, surface runoff, and water vapor transport in the biosphere, and plays an important role in the process of material exchange and energy transfer. As a neutral gas, although the content of water vapor in the atmosphere is small, it changes rapidly and is extremely active, there are three phases of solid, liquid, and gas, which are closely related to many weather changes. At the same time, the change of land surface temperature in the epicenter area is often detected, and water vapor is easily affected by temperature. Therefore, it is of great significance to explore the change of precipitable water vapor after the earthquake for secondary disaster response and post-earthquake reconstruction. precipitable water vapor refers to the precipitation formed after the water in the whole air column over the station is condensed into rain and snow. The BeiDou Navigation Satellite System is as known as BDS.

Commonly used precipitable water vapor observation technologies include radiosonde technology, spaceborne radiometer microwave radiometer, radio occultation technology, radar, and ground-based GNSS (Global Navigation Satellite System) observations (including BDS). GPS meteorology provides a new high-precision technology for meteorological research. BDS completed the global networking in June 2020, which successfully marked the independence of China's Navigation Satellite System. The construction of BDS with high performance, high precision, and high reliability not only improves the Beidou system but also contributes Chinese wisdom to the development of satellite navigation in the world. Beidou meteorology is one of the earliest important fields applied to BDS and has become a new situation in the comprehensive application of Beidou, the inversion of precipitable water vapor has the advantages of high precision, all-weather and low cost. When the satellite signal passes through the atmosphere, signal refraction will occur, which includes the tropospheric delay, that is, the delay of the satellite signal when passing through the unionized neutral atmosphere with a height of less than 50 km, making the propagation path bend and the propagation speed change. Zenith tropospheric delay (ZTD) is composed of Zenith hydrostatic delay (ZHD) and Zenith wet delay (ZWD). Although the ZHD accounts for a large proportion of the total tropospheric delay, it is relatively stable. While the ZWD accounts for a small proportion, it has the characteristics of rapid change due to the high and very active moisture content, which can extract precipitable water vapor. The ZTD is obtained by the processing of BDS observations and the ZHD is obtained by the classical tropospheric model. The ZWD can be obtained by subtracting the two types. Combined with the water vapor conversion coefficient, the precipitable water vapor can be obtained. The result is BDS precipitable water vapor, recorded as BDS-PWV.

Combined with the current research, most of them focus on earthquake prediction and monitoring before the earthquake, and few studies have studied the physical parameters and phenomena after the earthquake. According to statistics, mountain collapse, landslides, and debris flow caused by earthquakes are the most serious secondary disasters after the earthquake, and earthquakes of about 5.0 can induce landslides and debris flow. The larger the magnitude, the larger the induced area. At the same time, strong precipitation occurs easily after the earthquake, and the energy accumulated in the crust is continuously released, which increases the land surface temperature and promotes the evaporation of water into the air, thus forming a strong updraft in the surface cross-section. The water vapor in the air column becomes more, and the precipitation is formed after condensation. These secondary disasters related to precipitation have greatly affected post-disaster relief and reconstruction work. At present, most of the research is the study of water vapor before the earthquake or the study of thermal anomalies before the earthquake. There is little discussion on water vapor and land surface temperature after the earthquake, and there is no combination of precipitable water vapor and land surface temperature thermal anomalies based on different time series to further analyze the relationship. Although GNSS technology has more research work in earthquake-related water vapor, there are few studies on the characteristics of water vapor changes after earthquakes using BDS.

Terminology explanation:
PWV: Precipitable Water Vapor;
BDS: The BeiDou Navigation Satellite System;
LST: Land surface temperature;
ZTD: Zenith Tropospheric Delay;
RS: Radiosonde;
ERA5, the fifth generation ECMWF reanalysis for the global climate and weather for the past 8 decades;
this embodiment provides a prediction method for changes of physical parameters after earthquakes;

As shown in FIG. 1, a prediction method for changes in physical parameters after an earthquake includes:
- S101: obtaining a precipitable water vapor after the earthquake in the target monitoring area during the historical period;
- S102: verifying the accuracy of the precipitable water vapor collected in the historical period;
- S103: obtaining thermal anomaly data of the land surface temperature after the earthquake in the target monitoring area during the historical period;
- S104: based on the historical thermal anomaly data of the land surface temperature and the historical precipitable water vapor through accuracy verification, determining the time difference between the peak of the precipitable water vapor and the peak of the thermal anomaly of the land surface temperature;
- S105: when the earthquake occurs again in the target monitoring area, detecting the time point corresponding to the peak value of the thermal anomaly of the land surface temperature in the target monitoring area, adding the time point to the time difference to obtain the predicted time point of the peak value of precipitable water vapor, and outputting the predicted time point as the time point of secondary disaster.

Furthermore, S101: obtaining a precipitable water vapor after the earthquake in the target monitoring area during the historical period specifically includes:
- S1011: using the BeiDou Navigation Satellite System to obtain the precipitable water vapor BDS-PWV in the target monitoring area after the earthquake;
- S1012: obtaining the precipitable water vapor RS-PWV in the target monitoring area after the earthquake based on radiosonde;
- S1013: obtaining the precipitable water vapor ERA5-PWV in the target monitoring area after the earthquake based on the ERA5 reanalysis data.

Furthermore, S1011: using the BeiDou Navigation Satellite System to obtain the precipitable water vapor BDS-PWV in the target monitoring area after the earthquake specifically includes:
- S1011-1: obtaining the zenith tropospheric delay ZTD of the target monitoring area after the earthquake from the observation data of the BeiDou Navigation Satellite System;
- S1011-2: using the Saastamoinen tropospheric classical correction model and Yao Yibin atmospheric weighted average temperature model to obtain the precipitable water vapor BDS-PWV finally.

Furthermore, using the Saastamoinen tropospheric classical correction model and Yao Yibin atmospheric weighted average temperature model to obtain the precipitable water vapor BDS-PWV finally specifically includes:

ZTD is composed of ZHD and ZWD, ZHD acquirement adopts Saastamoinen classical tropospheric model, and calculates by inputting latitude, pressure, and height:

$$ZHD = 0.002277 \times \frac{P_s}{f(\varphi, H)} \tag{1}$$

$$f(\varphi,H)=1-0.00266 \cos 2\varphi - 0.00028H \tag{2}$$

among them, $P_s$ is a station pressure; $f(\varphi, H)$ is a function of $\varphi$ and H, $\varphi$ is a station radian latitude, H is a geodetic height.

ZWD contains a large amount of water vapor and changes rapidly, it is obtained by indirect method as follows:

$$ZWD=ZTD-ZHD \tag{3}$$

PWV is defined as the amount of precipitation formed by the condensation of water vapor in the air column above the station into rain and snow, which is expressed as a function of ZWD:

$$PWV = \Pi \times ZWD \tag{4}$$

among them, $\Pi$ is a water vapor conversion coefficient, calculated by Formula (5):

$$\Pi = \frac{10^6}{\rho_w \times R_v \times \left(\frac{K_3}{T_m} + K'_2\right)} \tag{5}$$

among them, $\rho_w=1\times10^3$ kg/m$^3$; $R_v$ =461,524J/kg·K) are water vapor ratio constants; $K_3$ and $K'_2$ are atmospheric refractive index constants, which are 3.739×10$^5$K$^2$/hpa and 22.1K/hpa, respectively. $T_m$ is an atmospheric weighted average temperature.

Using Yao Yibin atmospheric weighted average temperature model and selecting the model formula in the latitude range of the study area:

$$T_m=2.8034+0.9533T_s \tag{6}$$

among them, $T_s$ is the surface temperature.

The final PWV is recorded as BDS-PWV, where BDS represents the BeiDou Navigation Satellite System.

Figure 2A:
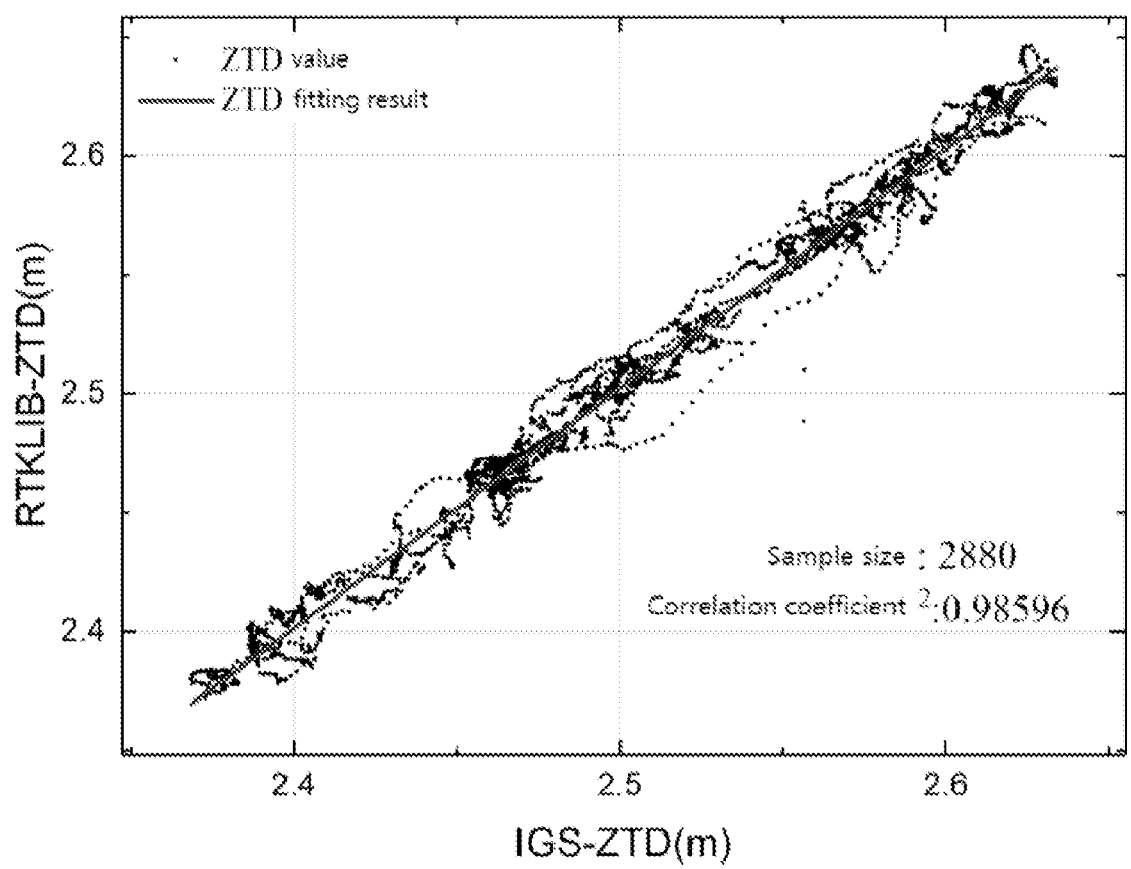
FIG. 2A-FIG. 2B are fitting results of ZTD values obtained by RTKLIB and the ZTD product from International GNSS Service (IGS).
Figure 2B:
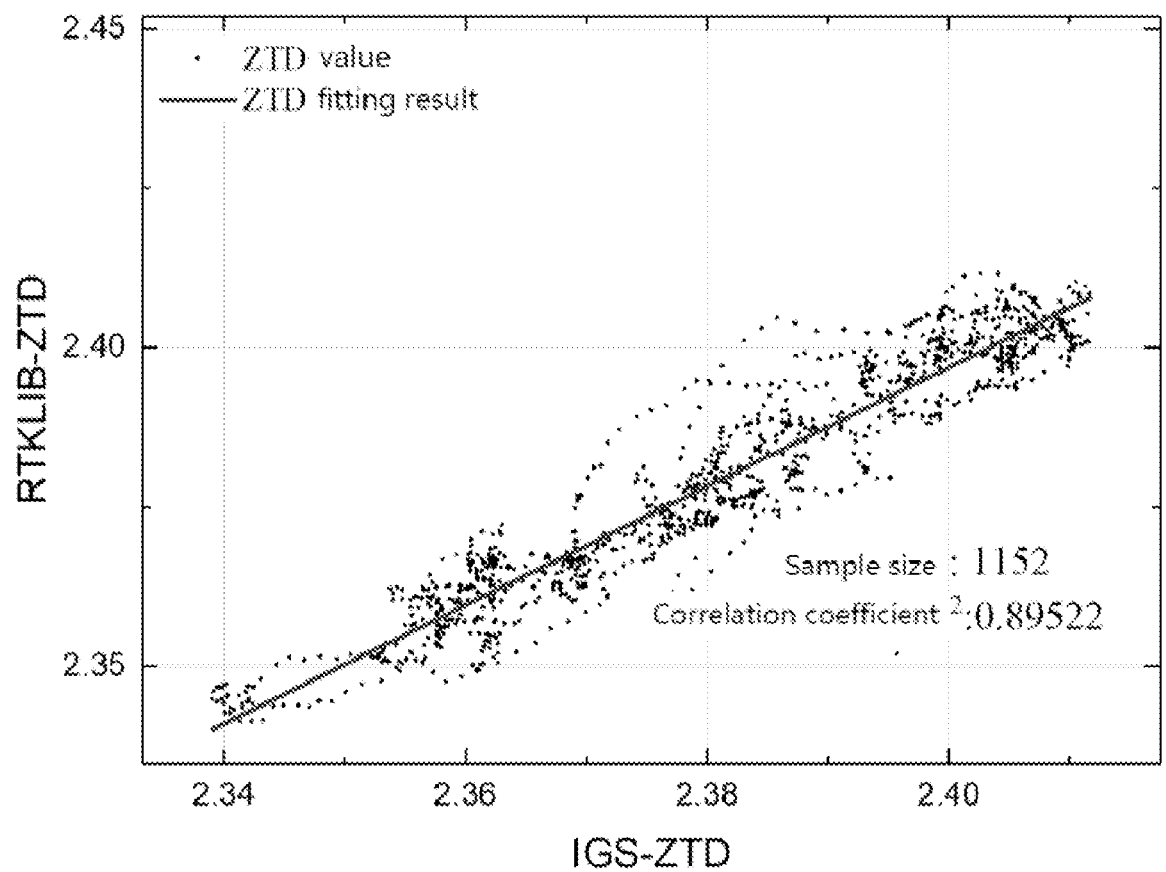

FIG. 2A-FIG. 2B are the fitting maps of ZTD value obtained by RTKLIB of Embodiment 1 and the ZTD product released by IGS.

Furthermore, S1012: obtaining the precipitable water vapor (RS-PWV) in the target monitoring area after the earthquake based on radiosonde specifically includes:

obtaining radiosonde data by releasing sounding balloons at 0 and 12 o'clock daily to obtain various meteorological data values.

Although the accuracy is high, the time resolution of the method is low. The PWV obtained from sounding data is recorded as RS-PWV, and RS represents radiosonde.

Furthermore, S1013: obtaining the precipitable water vapor ERA5-PWV in the target monitoring area after the earthquake based on the ERA5 reanalysis data specifically includes:

using the total column water vapor (TCWV) of ERA5 reanalysis data to extract the water vapor content in the target area of the epicenter.

The obtained PWV is recorded as ERA5-PWV, and ERA5 represents the fifth generation ECMWF atmospheric reanalysis of the global climate.

Furthermore, S102: verifying the accuracy of the precipitable water vapor collected in the historical period specifically includes:

S1021: unifying the elevations of the precipitable water vapor BDS-PWV derived from the BeiDou Navigation Satellite System (BDS), the precipitable water vapor RS-PWV derived from radiosonde, and the precipitable water vapor ERA5-PWV derived from ERA5 reanalysis;

S1022: calculating the first difference between the precipitable water vapor BDS-PWV obtained by the BeiDou Navigation Satellite System and the precipitable water vapor RS-PWV obtained by radiosonde;

S1023: calculating the second difference between the precipitable water vapor BDS-PWV obtained by the BeiDou Navigation Satellite System and the precipitable water vapor ERA5-PWV obtained by ERA5 reanalysis data;

S1024: if the first difference and the second difference are within the set range, it means the accuracy of BDS-PWV inversed by the precipitable water vapor obtained by the BeiDou Navigation Satellite System passed the verification; otherwise, the verification is not passed.

Furthermore, S1021: unifying the elevations of the precipitable water vapor BDS-PWV derived from the BeiDou Navigation Satellite System (BDS), the precipitable water vapor RS-PWV derived from radiosonde and the precipitable water vapor ERA5-PWV derived from ERA5 reanalysis specifically includes:

S1021-1: unifying the coordinate system of ERA5 data from potential to the geodetic height of the BDS coordinate system specifically includes:

S1021-11: converting potential to potential height, the formula is as follows:

$$GPH = \frac{GP}{g}$$

among them, GPH is a potential height; GH is a potential; g is an acceleration of gravity;

S1021-12: converting potential height to positive height, the formula is as follows:

$$H_{positive} = \frac{R(\varphi) \cdot Y_{45} \cdot GPH}{Y_s(\varphi) \cdot R(\varphi) - Y_{45} \cdot GPH}$$

$$R(\varphi) = \frac{6378137}{1.006803 - 0.006706 \cdot \sin^2(\varphi)}$$

$$Y_s(\varphi) = 9.780325 \cdot \left[\frac{1 + 0.00193185 \cdot \sin^2(\varphi)}{1 - 0.00669435 \cdot \sin^2(\varphi)}\right]^{0.5}$$

among them, $H_{positive}$ is a positive height; $R(\varphi)$ is an effective radius of the Earth at latitude $\varphi$; $Y_{45}$=9.806665; $Y_s(\varphi)$ is a normal gravity value of the rotating ellipsoid surface;

S1021-13: using the EGM 2008 model to calculate the geoid difference N. Using geoidegm2008grid.mat function in MATLAB, the geoid difference N can be obtained by inputting latitude and longitude and selecting EGM2008;

S1021-14: converting the positive height system to the geodetic height system, the formula is as follows:

$$H_{geodetic\ height} = H_{positive} + N$$

among them, $H_{geodetic\ height}$ is the geodetic height of the earth.

S1021-2: unifying the coordinate system of RS data from the potential height to the geodetic height of the BDS coordinate system specifically includes:

S1021-21: converting potential height to positive height, the formula is as follows:

$$H_{positive} = \frac{R(\varphi) \cdot Y_{45} \cdot GPH}{Y_s(\varphi) \cdot R(\varphi) - Y_{45} \cdot GPH}$$

$$R(\varphi) = \frac{6378137}{1.006803 - 0.006706 \cdot \sin^2(\varphi)}$$

$$Y_s(\varphi) = 9.780325 \cdot \left[\frac{1 + 0.00193185 \cdot \sin^2(\varphi)}{1 - 0.00669435 \cdot \sin^2(\varphi)}\right]^{0.5}$$

among them, $H_{positive}$ is a positive height; $R(\varphi)$ is an effective radius of the Earth at latitude $\varphi$; $Y_{45}$=9.806665; $Y_s(\varphi)$ is a normal gravity value of the rotating ellipsoid surface;

S1021-22: using the EGM 2008 model to calculate the geoid difference N. Using geoidegm2008grid.mat function in MATLAB, the geoid difference N can be obtained by inputting latitude and longitude and selecting EGM2008.

S1021-23: converting the positive height system to the geodetic height system, the formula is as follows:

$$H_{geodetic\ height} = H_{positive} + N$$

among them, $H_{geodetic\ height}$ is the geodetic height of the earth.

S1021-3: unifying the PWV elevation of multi-source data (RS and ERA5), and obtaining the PWV with unified elevation to the geodetic height system, the formula is as follows:

$$PWV_{h_1} = PWV_{h_2} \cdot \exp(-(h_1 - h_2)/2000)$$

among them, $PWV_{h_1}$ is the PWV with unified elevation; $PWV_{h_2}$ is the original PWV; $h_1$ is the geodetic height of the GNSS station; $h_2$ is the geodetic height corresponding to RS or ERA5;

finally, obtaining the BDS-PWV, RS-PWV, and ERA5-PWV with the unified elevations;

Furthermore, S103: obtaining thermal anomaly data of the land surface temperature after the earthquake in the target monitoring area during the historical period; specifically, using the product of MODIS (Moderate Resolution Imaging Spectroradiometer) sensor to extract the thermal anomaly data of the land surface temperature of the target monitoring area after the earthquake.

Furthermore, S103: obtaining thermal anomaly data of the land surface temperature after the earthquake in the target monitoring area during the historical period specifically includes:

S1031: obtaining the first comparison result by comparing the time series of the land surface temperature during the earthquake;

S1032: obtaining the second comparison result by comparing the land surface temperature during the earthquake with the land surface temperatures of the same geographical location at the same period of past 10 years;

S1033: obtaining the thermal anomaly result of the land surface temperature by combining the first comparison result and the second comparison result;

It should be understood that using the land surface temperature to detect post-earthquake thermal anomalies from two time series in the target area based on MODIS11A1 (MODIS/Terra LST/E Daily L3 Global 1 km SIN Grid) single-day land surface temperature L3(tertiary product) global grid data, on the one hand, it is the comparison of land surface temperature during the earthquake, on the other hand, it is the comparison of land surface temperature at the same time based on the ten-year background field.

Furthermore, S1031: obtaining the first comparison result by comparing the time series of the land surface temperature during the earthquake specifically includes:

In view of the comparison of land surface temperature in N days before and after the earthquake, the differences among the land surface temperature after the earthquake, before the earthquake, and during the earthquake are obtained, the thermal anomaly result of the land surface temperature of the set time range is obtained, and N is a positive integer.

Furthermore, S1032: obtaining the second comparison result by comparing the land surface temperature during the earthquake with the land surface temperatures of the same geographical location at the same period of past 10 years specifically includes:

comparing the land surface temperature on the day of the earthquake and after the earthquake with the background field established by the land surface temperature value of the past 10 years for year-on-year comparison, using the ALICE (Absolutely Local Index of Change of the Environment) index as the thermal anomaly index to obtain the thermal anomaly result of the land surface temperature.

For example, the earthquake on May 6 in the i-th year, then we establish a background field with the land surface temperature on May 6 every year for ten years to compare the land surface temperature anomaly of the day of May 6 of the i-th year specifically includes:

The land surface temperature during and after the earthquake is compared with the land surface temperatures of the same geographical location at the same time point based on the 10-year background field, highlighting the anomalies in the time-space domain, extracting the spatial thermal anomaly time point, and using the ALICE index as the thermal anomaly index:

$$ALICE(r_i, t) = \frac{V(r_i, t) - \mu_v(r_i)}{\sigma_{v(r_i)}} \quad (7)$$

among them, $V(r_1, t)$ refers to the LST value during the earthquake; $\mu_v(r_1)$ is the multi-year average LST value; $\sigma_v(r_1)$ is the standard deviation of multi-year land surface temperature.

Furthermore, S104: based on the historical thermal anomaly data of the land surface temperature and the historical BDS-PWV verified by accuracy validation, determining the time difference between the peak of the PWV and the peak of the thermal anomaly of the land surface temperature; it specifically include:

S1041: obtaining the time difference between the peak value of PWV and the peak value of thermal anomaly of the land surface temperature of earthquake occurrence every year;

S1042: obtaining the average time difference by averaging the time differences between the peak of the PWV and the peak of the thermal anomaly of the land surface temperature of all earthquake occurrences, and using the average time difference as the time delay between the peak value of PWV and the peak value of thermal anomaly of the land surface temperature.

When BDS-PWV increases, there is a great possibility of precipitation-related secondary disasters. Before the change of PWV, it is often accompanied by LST thermal anomaly. Therefore, it is possible to capture the LST thermal anomaly first, and then determine the time point when PWV suddenly increases to the peak according to the time delay between the PWV peak and the thermal anomaly of the land surface temperature, so as to take relevant measures to prevent the occurrence of secondary disasters, so the purpose of prediction is achieved. There is a time delay of BDS-PWV peak change and thermal anomaly of LST. The thermal anomalies are as follows: 1. The increase of LST after the earthquake; 2. The high value when the ALICE index is an indicator.

Combined with the change of precipitable water vapor monitored by the BeiDou Navigation Satellite System and the change of thermal anomaly of the land surface temperature at the epicenter after the earthquake, obtaining the delay information of precipitable water vapor and thermal anomaly of LST, so as to provide a reference value for secondary disaster prediction and post-disaster reconstruction after the earthquake in the region in the future.

Based on the observation data of the BeiDou Navigation Satellite System and the land surface temperature product, this invention proposes a method for inverting the atmospheric precipitable water vapor in the epicenter and nearby areas after the earthquake and further analyzes it with the thermal anomaly of the land surface temperature by using the technology of the BeiDou Navigation Satellite System.

The invention is based on the observation data of the BeiDou Navigation Satellite System of the land state network and the MOD11A1 single-day land surface temperature grid product. It proposes a method for inverting the atmospheric precipitable water vapor in the epicenter and nearby areas after the earthquake and further analyzes it with the thermal anomaly of the land surface temperature by using the technology of the BeiDou Navigation Satellite System according to three earthquakes that occurred in a certain area. Among them, the precipitable water vapor retrieved by the BeiDou Navigation Satellite System is compared with RS and ERA5 data, which verifies that BDS-PWV has good accuracy and can be applied to describe the change of water vapor after earthquakes. The invention belongs to the precipitable water vapor research paradigm of the BeiDou Navigation Satellite System and remote sensing intersection.

Selecting three regions with earthquakes randomly, and obtaining BDS-PWV according to the inversion process by using the observation data of the BeiDou Navigation Satellite System at the stations closest to the epicenters of the three earthquakes.

Figure 3A:
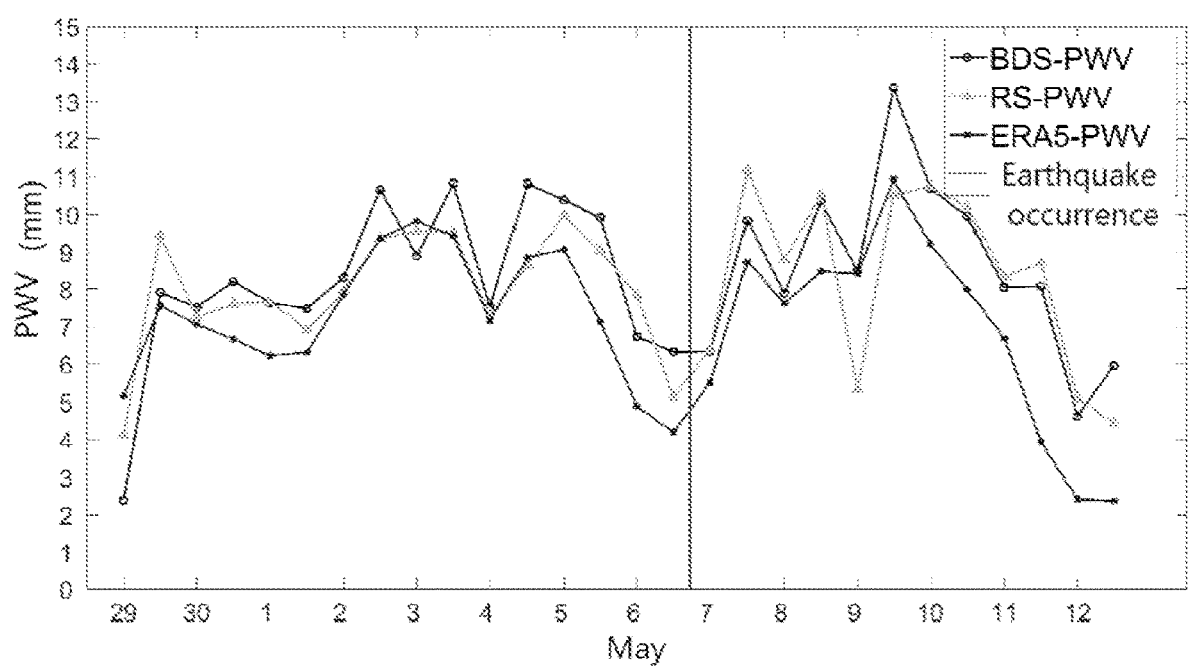
FIG. 3A-FIG. 3C are PWV time series diagrams of the multi-source data of three earthquakes in the first case.
Figure 3B:
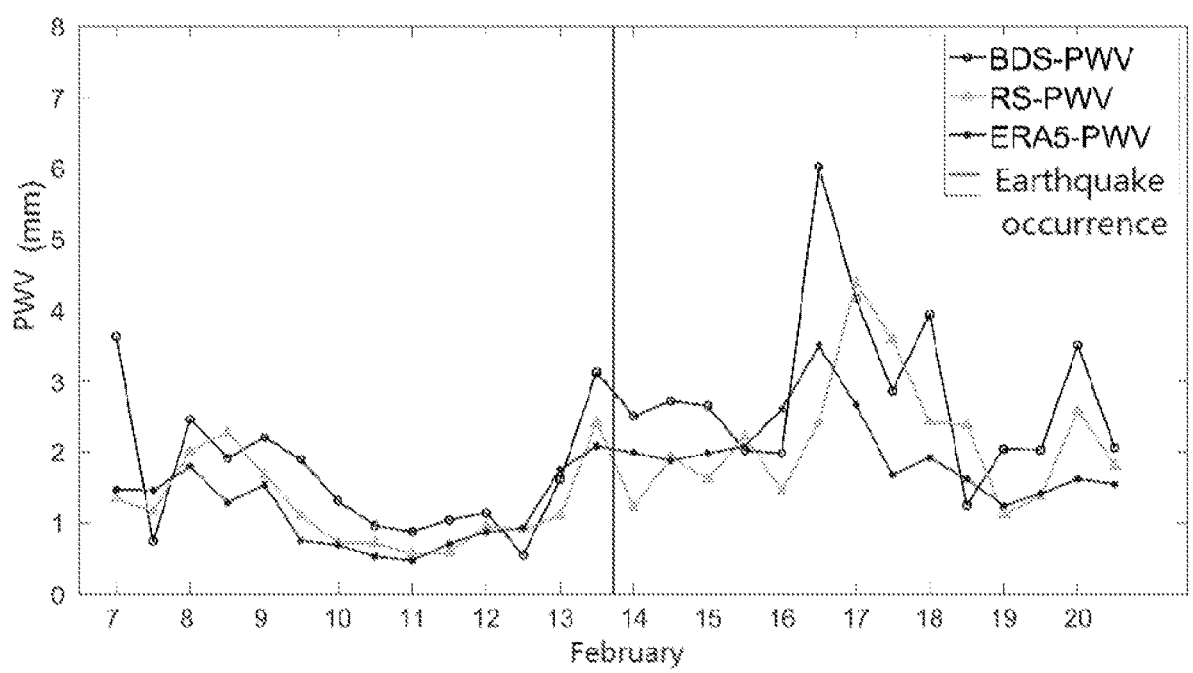
Figure 3C:
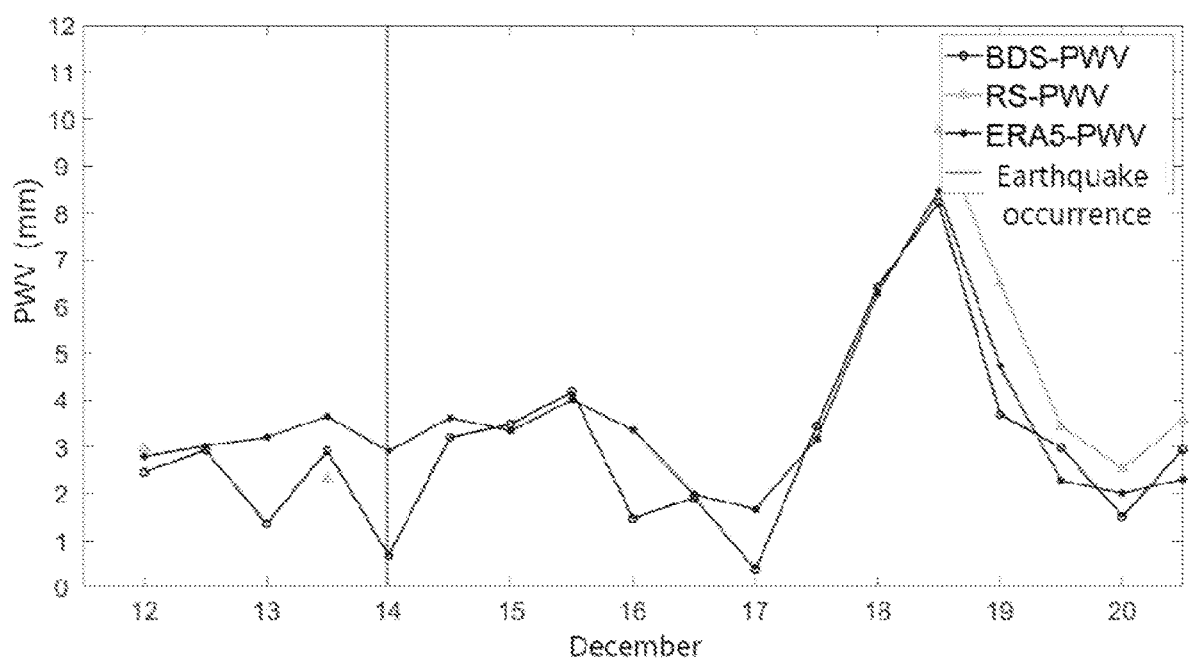
Figure 4A:
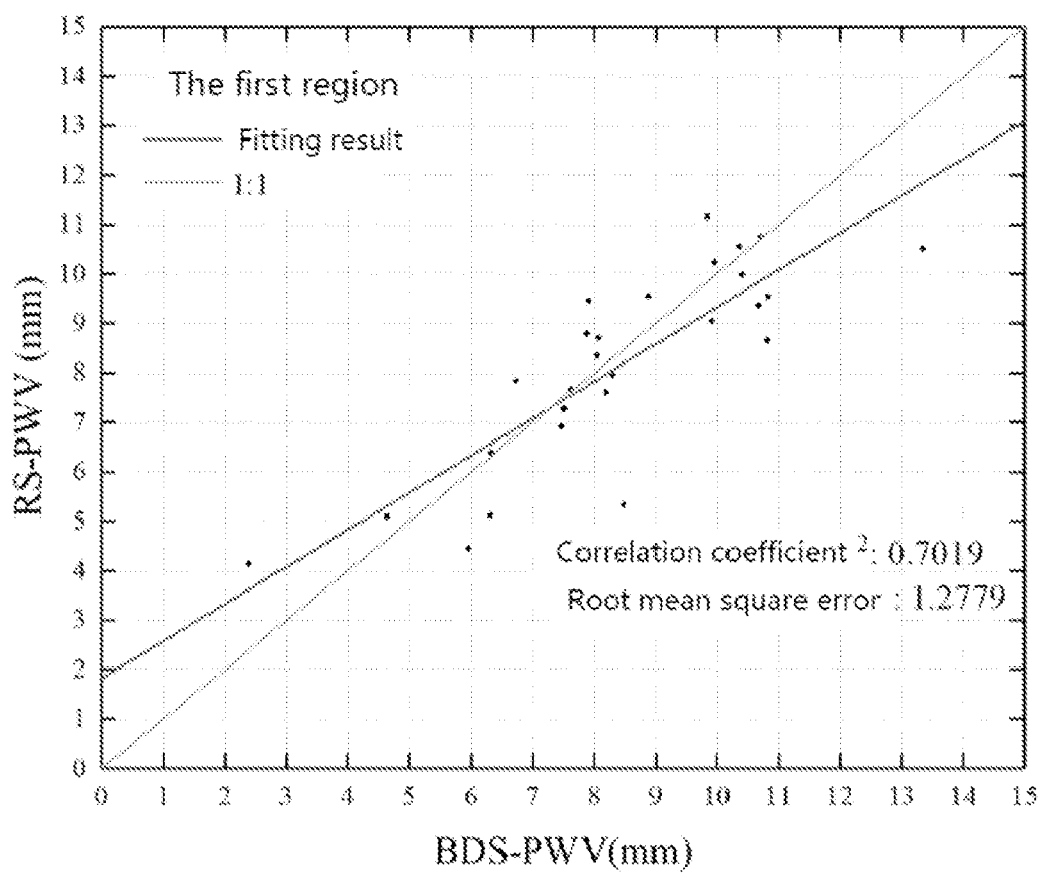
FIG. 4A-FIG. 4F are the accuracy verifications of BDS-PWV, RS-PWV and ERA5-PWV obtained by the inversion of Embodiment 1.
Figure 4B:
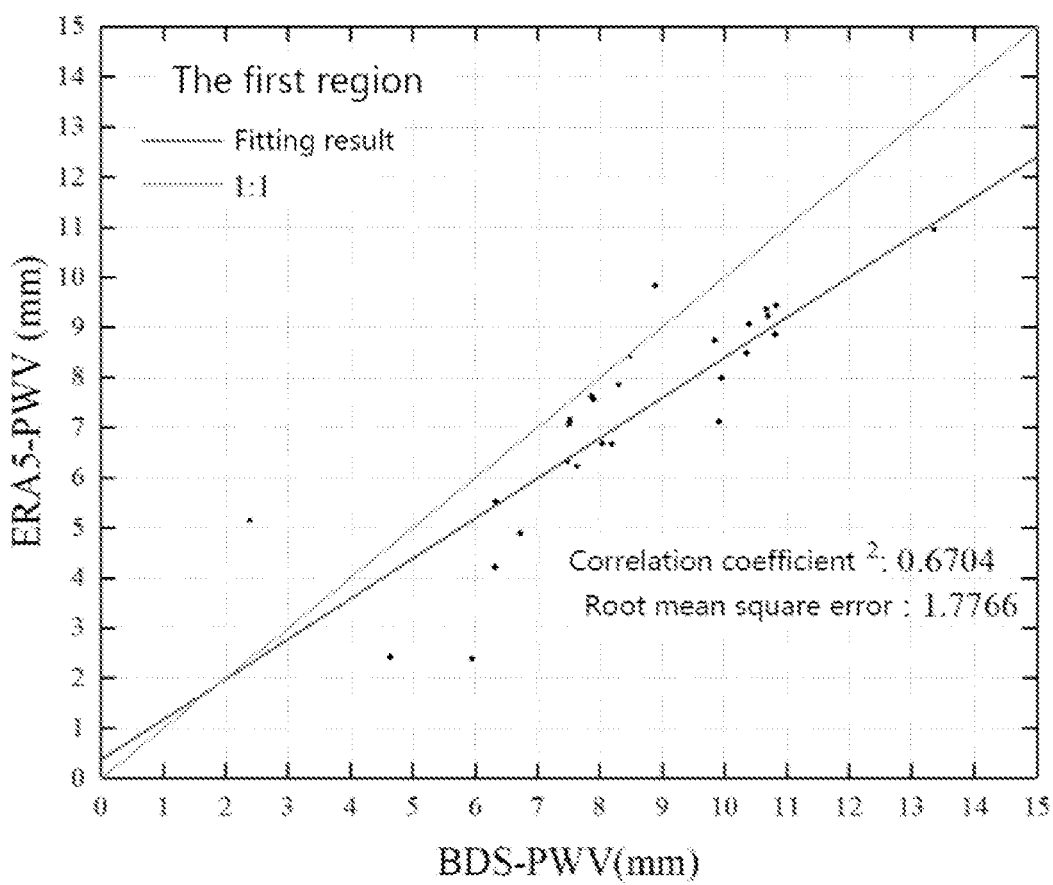
Figure 4C:
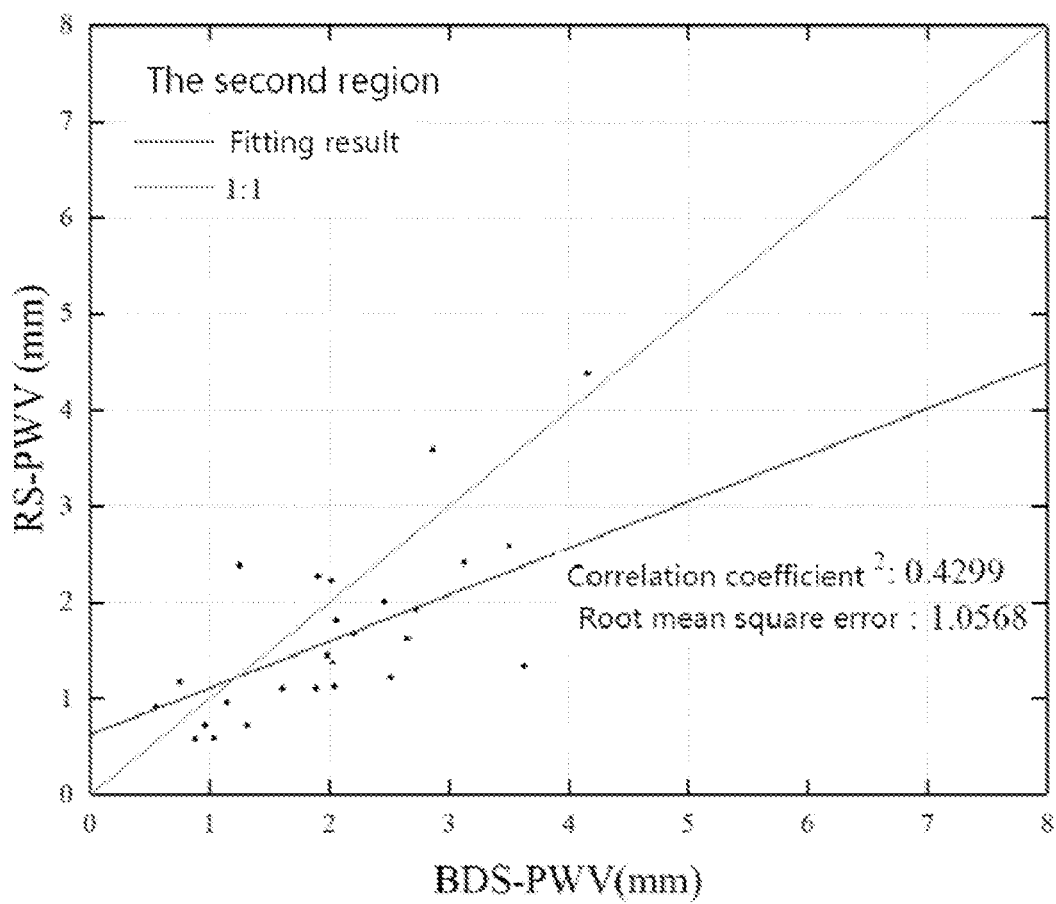
Figure 4D:
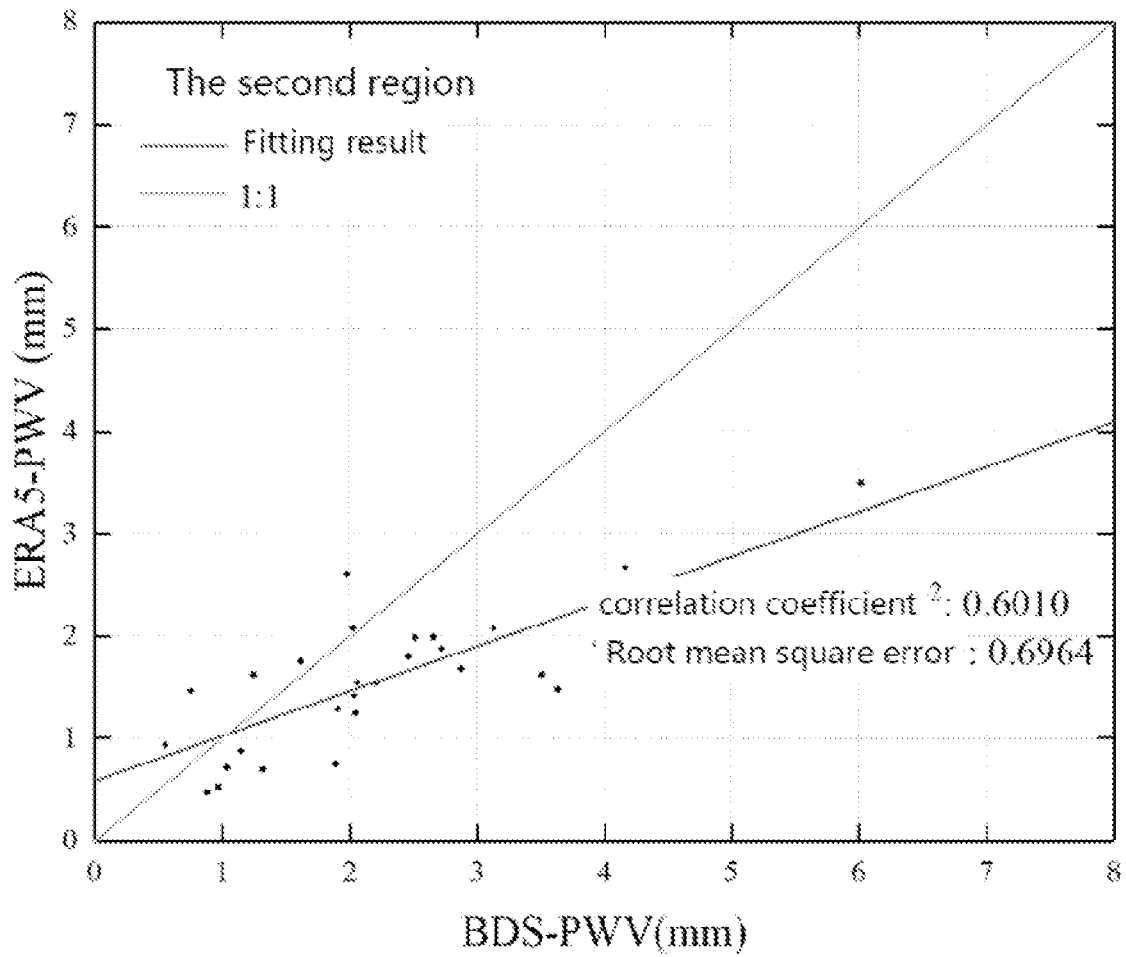
Figure 4E:
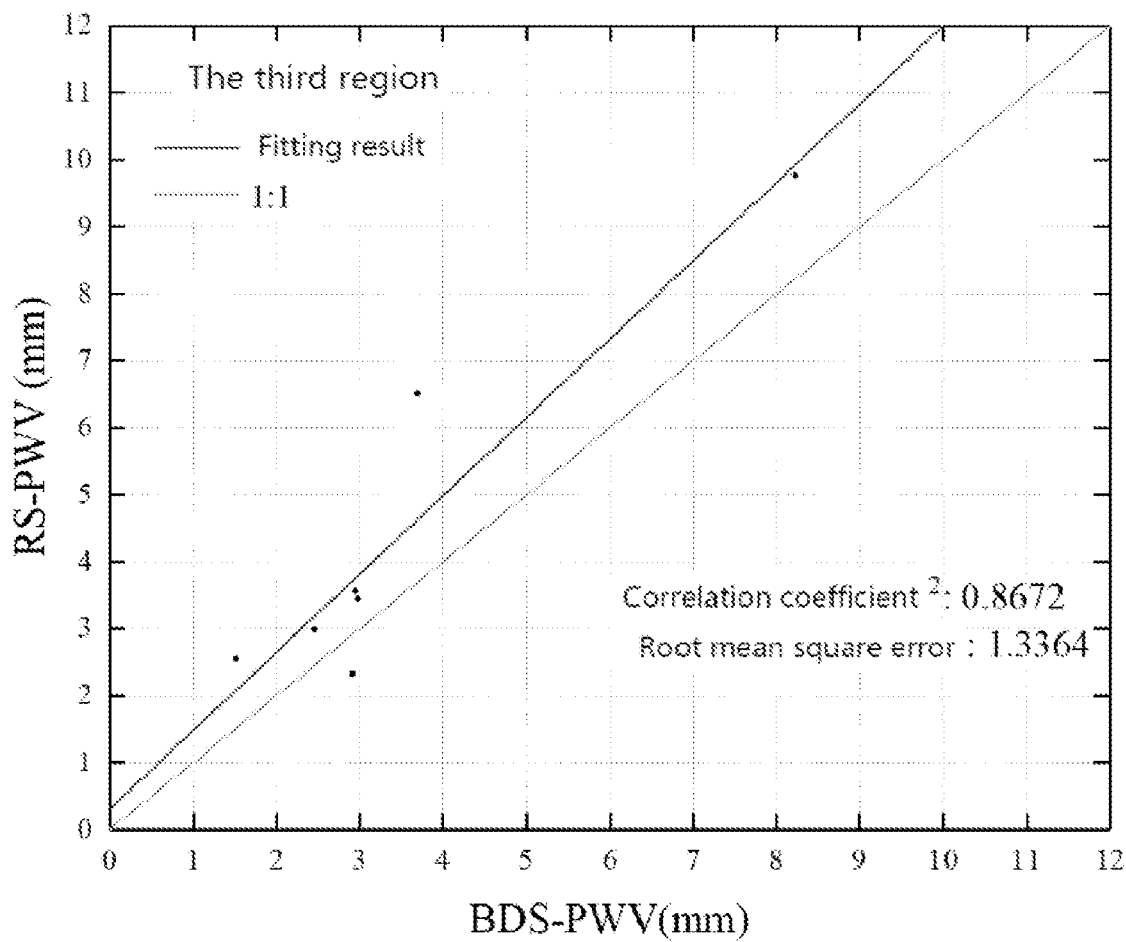
Figure 4F:
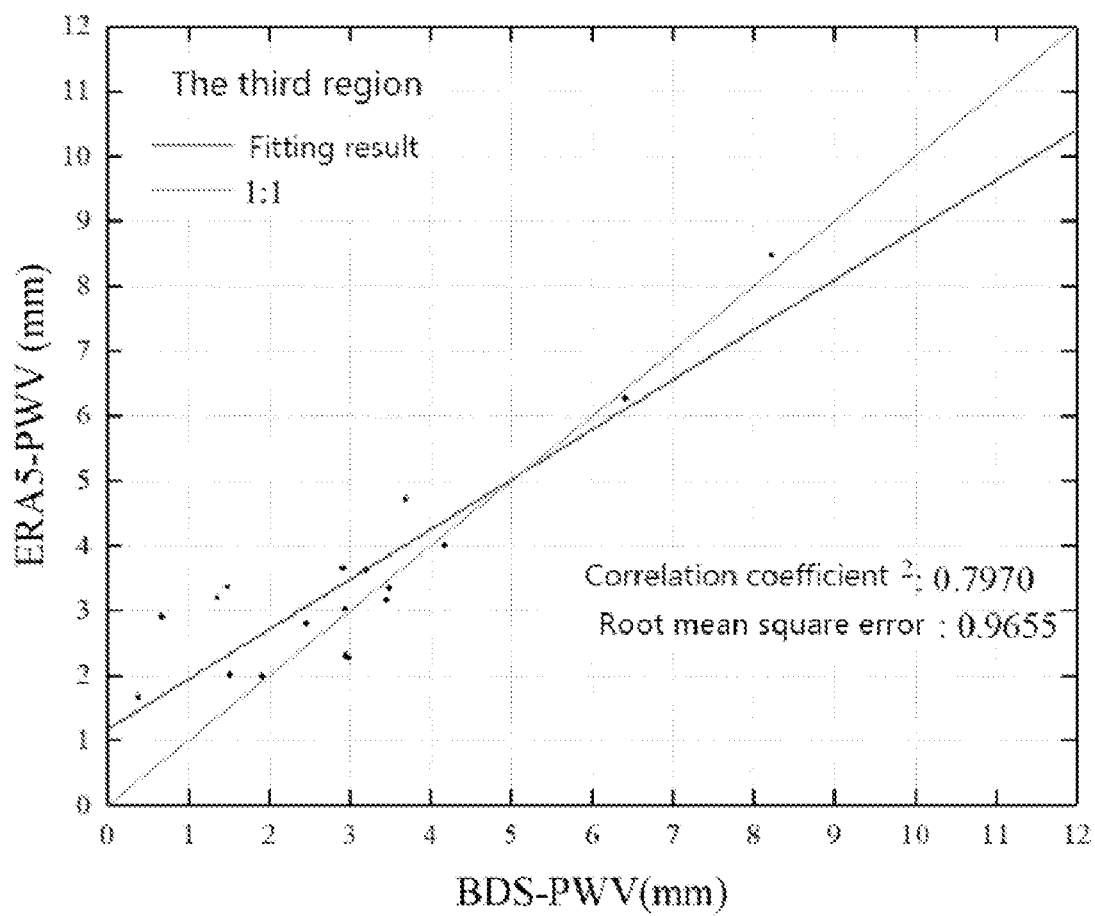

According to FIG. 3A-FIG. 3C, all the precipitable water vapor data after the earthquake in the first, second, and third regions show abnormal increases. When the earthquake broke out in the first region, BDS-PWV, RS-PWV, and ERA5-PWV were all at the minimum value, then PWV increased and showed an upward trend after that, it peaked 3 days after the earthquake due to the aftershock on May 7(BDS-PWV was about 14 mm, RS and ERA5 were about 11 mm). Aftershocks further promote energy release, and water vapor continues to collide and accumulate, and then forms precipitation. BDS-PWV showed a sharp rise three days after the earthquake in the second region, the highest peak reached 6 mm, which is the highest value in the whole earthquake process. At the same time, compared with RS-PWV and ERA5-PWV, the change of BDS-PWV was most obvious. For earthquakes in the third region, the PWV of the three data sources reached the maximum value on December 18(the earthquake occurred at 23:00 on December 13 and lasted until 2:00 the next day). The PWV of BDS and ERA5 was about 8.2 mm, and the RS detection result reached 10 mm and then decreased sharply.

The above analysis shows that there is an anomaly of precipitable water vapor after earthquakes, mainly a trend of increasing first and then decreasing. Earthquakes lead to the opening and closing of pore cracks in rocks under tectonic stress, releasing a large amount of geothermal energy, such as hot gas and hot water. The thermal effect accelerates the evaporation of water and the movement of water vapor over the epicenter, which is also the reason for the anomaly change of precipitable water vapor during the earthquake.

The coordinate system of BDS-PWV is geodetic height, the coordinate system of sounding data is geopotential height, and the ERA5 reanalysis data is geopotential. After the elevation is unified to the geodetic height, the accuracy is verified.

The correlation coefficients and root mean square errors (RMSE) are shown in FIG. 4A-FIG. 4F. The BDS-PWV of the earthquake in the first region is very close to the RS-PWV and ERA5-PWV, with RMSE of 1.28 mm and 1.78 mm, respectively. In the earthquake of the second region, the RMSEs of BDS-PWV against RS-PWV and ERA5-PWV are 1.06 mm and 0.70 mm, respectively. The RMSEs of PWV in the earthquake of the third region is 1.34 mm and 0.97 mm. It can be seen from the above analysis that the RMSEs of the precipitable water vapor retrieved by the BeiDou Navigation Satellite System against the results of the other two data sources are less than 2 mm, and the accuracy and reliability of the inversion are very high, which can provide an effective precipitable water vapor reference for the meteorological research of the earthquake process.

By analyzing the changes in the land surface temperature corresponding to the three earthquakes during the earthquake process, it can be seen that on the day of the earthquake outbreak in the first region, LST presents a large area maximum of 6~2° C., which is about 12~16° C. higher than the three days before the earthquake. For the earthquake in the second region, the LST at the epicenter of the earthquake has a trend of increasing westward, and stables at −10~6° C., but it begins to decrease gradually within 5 days after the earthquake, and then until February 20, LST returns to the pre-earthquake level. In the earthquake of the third region, LST rises in the epicenter and nearby areas, and lasts for 3 days. From the whole process, the LST on the day or the next day of the earthquake is higher than the previous days. The LST after the three earthquakes is significantly higher than that before the earthquake, maintains at a high value for about three days, and then decreases to normal levels. The reason may be that the energy released during the earthquake gradually dissipates several days after the earthquake.

Secondly, the invention also uses the RST (Robust satellite technique) algorithm to highlight the spatial thermal anomalies of the same period as earthquake period and the same location as earthquake location based on the ten-year background field data. The ALICE index is used as a thermal anomaly index.

The ALICE index during the earthquake in the first region shows that there is a serious thermal anomaly in the epicenter and nearby areas on the 6th and 7th compared to previous years with the maximum ALICE value of 1.5, and the thermal anomaly of the land surface temperature appears based on the ten-year background field. Although there is cloud cover missing data from the 8th to the 10th, the anomaly intensity gradually weakened from the 11th.

The ALICE index during the earthquake in the second region is above 1 from the 13th to the 15th of a month, and then it is back to normal (0±0.5), indicating that the LST of the earthquake in this year is higher than that of the same area in the past decade, and there was a thermal anomaly.

After the earthquake in the third region, the ALICE index of the epicenter and its vicinity rise to 1, and the LST after the earthquake is higher than that of many years, and the thermal anomaly based on 10-year data is quite obvious.

In short, the ALICE indexes have increased after earthquakes, and land surface temperature is higher than the same period of previous ten years with the thermal anomaly appearance, and then there is almost no subsequent change.

The above seismic thermal anomalies are extracted from the comparison of LST before and after the earthquake and the comparison of LST in the same period based on the ten-year background data. It is found that the earthquake can cause the thermal anomaly of the land surface temperature.

The maximum LST in the epicenter area of the first region is on the 6th of a month, and the PWV begins to increase and reaches the first peak on the next day, the maximum PWV peak is on the 9th of a month, which is 3 days followed by the maximum LST.

For the earthquake in the second region, the highest LST is measured on the day of the earthquake (13th), and the BDS-PWV reaches the maximum on the 16th, which is 3 days later than the maximum LST.

The earthquake in the third region occurs at 23:00 on the 13th of a month, and the aftershock continues until 2 am in the next day, the LST is the highest in the epicenter and nearby areas on the 15th, and the BDS-PWV peaks on the 18th of a month, which is 3 days later than the maximum LST.

In summary, there is a delay between the peak changes of LST and BDS-PWV after the three earthquakes selected in the experiment, that is, the peak change of precipitable water vapor follows the peak change of land surface temperature. There is a certain relationship between the change of BDS-PWV and the thermal anomaly of land surface temperature. The peak value of precipitable water vapor appears three days later than the increase in land surface temperature.

According to the reference background data, it is found when the thermal anomaly of the land surface temperature at the epicenter is more serious, the BDS-PWV will be higher;

otherwise, if the land surface temperature anomaly is weak or no anomaly, there is no prominent anomaly change of BDS-PWV at the epicenter.

Earthquakes induce surface and underground thermal anomalies, and they can trigger more thermal energy release reactions and promote water vapor activity, especially the evaporation, transportation, and accumulation of water vapor during upward movement. A large amount of PWV is deposited in the atmosphere, and the precipitation will be generated when it exceeds a certain degree. Through the retrieval of the BeiDou Navigation Satellite System technology, it is found that PWV will increase after the earthquake, and it has a delayed relationship with the thermal anomaly of the land surface temperature. Based on this discovery, the invention believes that it is of great significance for the prediction and prevention of secondary disasters related to precipitation after the earthquake and post-earthquake reconstruction.

According to the above process in the study area, the results of BDS-PWV peak and thermal anomaly are obtained combined with the historical seismic data of the current study area, and the delay time is finally obtained. Based on the delay time, the time of thermal anomaly detected in advance when another earthquake occurs in the current area can be studied, so the PWV peak time point is calculated by adding the historical delay time to predict the secondary disaster.

The invention uses the BeiDou Navigation Satellite System to invert the PWV of the epicenter after the earthquake and further explores its relationship with LST in combination with the thermal anomaly of the LST.

The BeiDou Navigation Satellite System of the invention inverts the PWV over the epicenter and nearby areas after the earthquake and further analyzes its relationship with the thermal anomaly of the land surface temperature, which provides a reference for the prediction and monitoring of secondary disasters related to precipitation after the earthquake and post-earthquake reconstruction.

Embodiment 2

This embodiment provides a prediction system for changes of physical parameters after earthquakes;
a prediction system for physical parameter changes after earthquakes includes:
the first acquisition module, which is configured to obtain the precipitable water vapor after the earthquake in the target monitoring area during the historical period;
the accuracy verification module, which is configured to verify the accuracy of the precipitable water vapor collected in the historical period;
the second acquisition module, which is configured to obtain the thermal anomaly data of the land surface temperature after the earthquake in the target monitoring area in the historical period;
the time difference determination module, which is configured to determine the time difference between the peak of the precipitable water vapor and the peak of the thermal anomaly of the land surface temperature based on the historical data of the land surface temperature and the historical verified precipitable water vapor;
the prediction output module, which is configured to detect the time point corresponding to the peak value of the thermal anomaly of the land surface temperature in the target monitoring area, adds the time point to the time difference to obtain the predicted time point of the peak value of precipitable water vapor, and output the predicted time point as the time point of secondary disaster when the earthquake occurs again in the target monitoring area.

It should be noted that the first acquisition module, the accuracy verification module, the second acquisition module, the time difference determination module, and the prediction output module correspond to steps S101 to S105 in Embodiment 1. The above modules are the same as the examples and application scenarios realized by the corresponding steps but are not limited to the contents disclosed in Embodiment 1. It should be noted that the above modules as part of the system can be executed in a computer system such as a set of computer executable instructions.

The above is only a preferred embodiment of the invention and is not used to limit the invention. For technicians in this field, the invention can have various changes and modifications. Any modification, equivalent substitution, improvement, etc. made within the spirit and principles of the invention shall be included in the protection scope of the invention.

What is claimed is:
1. A prediction method for changes of physical parameters after earthquakes, comprising:
obtaining a precipitable water vapor after an earthquake in a target monitoring area during a historical period;
verifying accuracy of the precipitable water vapor collected in the historical period;
wherein the step of verifying the accuracy of the precipitable water vapor collected in the historical period comprises:
unifying elevations of the precipitable water vapor derived from a BeiDou Navigation Satellite System, the precipitable water vapor derived from radiosonde, and the precipitable water vapor derived from ERA5 reanalysis;
calculating a first root mean square error (RAISE) between the precipitable water vapor obtained by the BeiDou Navigation Satellite System and the precipitable water vapor obtained by radiosonde; and
calculating a second RMSE between the precipitable water vapor obtained by the BeiDou Navigation Satellite System and the precipitable water vapor obtained by ERA5 reanalysis data;
wherein if the first RMSE and the second RMSE are within a set range, it means an accuracy of a BeiDou Navigation Satellite System-precipitable water vapor (BDS-PWV) inversed by the BeiDou Navigation Satellite System passed a verification; otherwise, the verification is not passed;
obtaining thermal anomaly data of land surface temperature after the earthquake in the target monitoring area during the historical period;
based on historical thermal anomaly data of the land surface temperature and the historical precipitable water vapor of verified accuracy, determining a time difference between a peak value of the precipitable water vapor and a peak value of a thermal anomaly of the land surface temperature; and
when the earthquake occurs again in the target monitoring area, detecting a time point corresponding to the peak value of the thermal anomaly of the land surface temperature in the target monitoring area, adding the time point to the time difference to obtain a predicted time point of the peak value of the precipitable water vapor, and outputting the predicted time point as a time point of secondary disaster occurrence.

2. The prediction method for changes of physical parameters after earthquakes according to claim 1, wherein the step of obtaining the precipitable water vapor after the earthquake in the target monitoring area during the historical period comprises:
    using the BeiDou Navigation Satellite System to retrieve the precipitable water vapor in the target monitoring area after the earthquake;
    obtaining the precipitable water vapor from radiosonde in the target monitoring area after the earthquake; and
    obtaining the precipitable water vapor from ERA5 reanalysis data in the target monitoring area after the earthquake.

3. The prediction method for changes of physical parameters after earthquakes according to claim 2, wherein the step of using the BeiDou Navigation Satellite System to obtain the precipitable water vapor in the target monitoring area after the earthquake comprises:
    obtaining a zenith tropospheric delay of the target monitoring area after the earthquake from observation data of the BeiDou Navigation Satellite System; using a tropospheric classical correction model, Saastamoinen model and an atmospheric weighted average temperature model to obtain the precipitable water vapor finally.

4. The prediction method for changes of physical parameters after earthquakes according to claim 1, wherein the step of obtaining the thermal anomaly data of the land surface temperature after the earthquake in the target monitoring area during the historical period comprises:
    using a Moderate Resolution Imaging Spectroradiometer (MODIS) sensor to extract the thermal anomaly data of the land surface temperature after the earthquake in the target monitoring area.

5. The prediction method for changes of physical parameters after earthquakes according to claim 1, wherein the step of obtaining the thermal anomaly data of the land surface temperature after the earthquake in the target monitoring area during the historical period comprises:
    obtaining a first comparison result by comparing time series of the land surface temperature during the earthquake;
    obtaining a second comparison result by comparing the land surface temperature during the earthquake with the land surface temperatures at the same geographical location of the same period in the past 10 years; and
    obtaining a thermal anomaly result of the land surface temperature by combining the first comparison result and the second comparison result.

6. The prediction method for changes of physical parameters after earthquakes according to claim 5, wherein the step of obtaining the first comparison result by comparing the time series of the land surface temperature during the earthquake comprises:
    in view of a comparison of land surface temperature in N days before and after the earthquake, differences among the land surface temperature after the earthquake, before the earthquake, and during the earthquake are obtained, and the thermal anomaly result of the land surface temperature of a set time range is obtained, wherein N is a positive integer.

7. The prediction method for changes of physical parameters after earthquakes according to claim 5, wherein the step of obtaining the second comparison result by comparing the land surface temperature on the day of the earthquake with the land surface temperatures of the same geographical location at the same time point in the past 10 years comprises:
    comparing the land surface temperature after the earthquake with a background field established by the land surface temperature of the same period of past 10 years for year-on-year comparison, and using an ALICE index as a thermal anomaly index to obtain the thermal anomaly result of the land surface temperature.

8. The prediction method for changes of physical parameters after earthquakes according to claim 1, wherein the step of based on the historical thermal anomaly data of the land surface temperature and the historical precipitable water vapor of verified accuracy, determining the time difference between the peak value of the precipitable water vapor and the peak value of the thermal anomaly of the land surface temperature comprises:
    obtaining the time difference between the peak value of the precipitable water vapor and the peak value of the thermal anomaly of the land surface temperature every year;
    obtaining an average time difference by averaging the time differences of all years, and using the average time difference as a time delay between the peak value of the precipitable water vapor and the peak value of the thermal anomaly of the land surface temperature.

9. A prediction system for physical parameter changes after earthquakes, comprising:
    a first acquisition module, configured to obtain a precipitable water vapor after an earthquake in a target monitoring area during a historical period; and
    an accuracy verification module, configured to verify an accuracy of the precipitable water vapor collected in the historical period;
        wherein verifying the accuracy of the precipitable water vapor collected in the historical period comprises:
        unifying elevations of the precipitable water vapor derived from a BeiDou Navigation Satellite System, the precipitable water vapor derived from radiosonde, and the precipitable water vapor derived from ERA5 reanalysis;
        calculating a first root mean square error (RMSE) between the precipitable water vapor obtained by the BeiDou Navigation Satellite System and the precipitable water vapor obtained by radiosonde; and
        calculating a second RMSE between the precipitable water vapor obtained by the BeiDou Navigation Satellite System and the precipitable water vapor obtained by ERA5 reanalysis data;
        wherein if the first RMSE and the second RMSE are within a set range, it means an accuracy of a BeiDou Navigation Satellite System-precipitable water vapor (BDS-PWV) inversed by the precipitable water vapor obtained by the BeiDou Navigation Satellite System passed a verification; otherwise, the verification is not passed;
    a second acquisition module, configured to obtain thermal anomaly data of a land surface temperature after the earthquake in the target monitoring area in the historical period;
    a time difference determination module, configured to determine a time difference between a peak value of the precipitable water vapor and a peak value of the thermal anomaly of the land surface temperature based on historical thermal anomaly data of the land surface temperature and historical precipitable water vapor of verified accuracy; and a prediction output module, configured to detect a time point corresponding to the peak value of the thermal anomaly of the land surface temperature in the target monitoring area, add the time difference to the time point to obtain a predicted time point of the peak value of the precipitable water vapor, and output the predicted time point as a time point of secondary disaster when the earthquake occurs again in the target monitoring area.

* * * * *